(12) United States Patent
Sakurai et al.

(10) Patent No.: US 12,017,299 B2
(45) Date of Patent: Jun. 25, 2024

(54) LASER WELDING METHOD

(71) Applicant: Panasonic Intellectual Property Management Co., Ltd., Osaka (JP)

(72) Inventors: Michio Sakurai, Osaka (JP); Toru Sakai, Hyogo (JP); Kenta Kubota, Osaka (JP); Takashi Urashima, Osaka (JP); Daichi Higashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 834 days.

(21) Appl. No.: 17/066,854

(22) Filed: Oct. 9, 2020

(65) Prior Publication Data
US 2021/0023655 A1    Jan. 28, 2021

Related U.S. Application Data

(63) Continuation of application No. PCT/JP2019/011444, filed on Mar. 19, 2019.

(30) Foreign Application Priority Data

Apr. 13, 2018    (JP) ................. 2018-077694

(51) Int. Cl.
*B23K 26/21*    (2014.01)
*B23K 26/082*    (2014.01)
*B23K 26/70*    (2014.01)

(52) U.S. Cl.
CPC ............ *B23K 26/21* (2015.10); *B23K 26/082* (2015.10); *B23K 26/705* (2015.10)

(58) Field of Classification Search
CPC ................ B23K 26/082; B23K 26/362; B23K 2101/34; B23K 2103/42; B23K 26/0006;
(Continued)

(56) References Cited

U.S. PATENT DOCUMENTS

| 2012/0285936 A1 | 11/2012 | Urashima et al. |
| 2015/0352666 A1 | 12/2015 | Fujita et al. |

(Continued)

FOREIGN PATENT DOCUMENTS

| JP | 2006-126042 | 5/2006 |
| JP | 2012-236196 | 12/2012 |

(Continued)

OTHER PUBLICATIONS

JP 2015196169 A (Year: 2015).*
(Continued)

*Primary Examiner* — Vy T Nguyen
(74) *Attorney, Agent, or Firm* — Wenderoth, Lind & Ponack, L.L.P.

(57) ABSTRACT

Laser welding is performed while moving irradiation positions of a laser beam and a measurement beam in forward, rightward, rearward and leftward directions, and the penetration depth of a weld portion is measured during laser welding in each of the directions. Then, a direction in which a value smaller than a reference value is measured is determined to be an optical axis deviation direction, and a correction value is added to the values measured during the laser welding when the laser welding is performed in the optical axis deviation direction.

8 Claims, 10 Drawing Sheets

(58) Field of Classification Search
CPC .. B23K 26/032; B23K 26/064; B23K 26/127; B23K 2101/006; B23K 2103/10; B23K 2103/16; B23K 2103/54; B23K 26/00; B23K 26/042; B23K 26/046; B23K 26/0604; B23K 26/0622; B23K 26/0624; B23K 26/08; B23K 26/083; B23K 26/0869; B23K 26/0884; B23K 26/352; B23K 26/38; B23K 26/402; B23K 37/0294; G02B 19/0009; G02B 19/0014; G02B 19/0047; G02B 26/06; G02B 26/0816; G02B 3/14; G02F 1/294; G01H 9/00
USPC ............ 219/121.69, 121.67, 121.72, 121.64, 219/121.68, 121.63, 121.83, 121.6, 219/121.85, 121.78, 121.73, 121.71, 219/121.61, 121.76, 121.7, 121.84, 219/121.82, 121.62, 121.75, 121.74, 219/121.8, 121.66, 121.77, 121.65, 219/121.81, 121.86, 137 R, 74, 121.14, 219/76.1, 76.12, 117.1, 136, 76.14, 219/121.39, 121.44, 91.2, 118, 137 WM, 219/121.46, 121.13, 75, 78.01, 86.1, 219/121.18, 121.45, 69.17, 121.11, 125.1, 219/385, 121.35, 158, 617, 68, 136 PS, 219/124.34, 59.1, 85.12, 130.1, 383, 83, 219/119, 121.59, 148, 161, 61, 130.21, 219/130.51, 384, 72, 121.12, 121.36, 219/121.54, 121.58, 137.2, 146.22, 603, 219/104, 121.19, 121.48, 121.4, 127, 162, 219/73, 87, 124.02, 124.1, 124.31, 219/125.11, 101, 121.31, 121.55, 121.56, 219/138, 146.1, 200, 615, 73.21, 85.13, 219/130.5, 69.1, 73.2, 80, 86.7, 86.9, 219/121.29, 121.34, 130.01, 201, 64, 219/69.11, 78.16, 86.24, 91.22, 93, 94, 219/98, 108, 121.15, 121.17, 137.71, 219/137.9, 601, 76.15, 86.26, 99, 110, 219/121.21, 121.23, 129, 133, 444.1, 602, 219/61.2, 616, 79, 81, 121.33, 124.22, 219/128, 145.1, 145.22, 443.1, 600, 219/76.11, 76.16, 84, 121.22, 121.32, 219/121.5, 124.4, 132, 159, 50, 648, 67, 219/730, 78.02, 78.15, 85.15, 86.22, 219/121.28, 121.3, 121.47, 123, 124.21, 219/103.32, 137.43, 149, 153, 160, 405, 219/465.1, 476, 492, 55, 56.22, 58, 60 R, 219/61.1, 61.7, 611, 633, 635, 647, 66, 219/678, 82, 85.1, 86.32, 86.33, 92, 102, 219/121.43, 130.33, 144, 154, 203, 243, 219/388, 468.1, 477, 522, 56.1, 61.11, 219/679, 69.18, 736, 76.13, 78.14, 85.16, 219/85.2, 85.22, 91.21, 106, 107, 116, 219/120, 121.25, 121.26, 121.37, 121.38, 219/121.41, 121.51, 121.57, 122, 126, 219/130.4, 137.42, 137.61, 145.23, 146.3, 219/152, 157, 219, 223, 230, 244, 386, 219/391, 430, 439, 440, 452.11, 458.1, 219/459.1, 466.1, 482, 502, 509, 517, 53, 219/537, 539, 540, 544, 56, 57, 60.2, 219/607, 61.3, 61.5, 612, 619, 621, 625, 219/638, 643, 644, 651, 653, 674, 677, 219/69.12, 69.2, 700, 725, 728, 73.1, 219/73.11, 738, 756, 759, 762, 85.18, 219/86.21, 86.23, 86.31, 86.8, 91.23, 97, 219/100, 103, 105, 113, 121.53, 124.33, 219/130.31, 137.31, 137.7, 145.21, 219/146.23, 146.31, 146.32, 202, 270, 219/438, 54, 541, 542, 543, 553, 60 A, 219/61.12, 61.13, 610, 62, 63, 645, 65, 219/659, 686, 69.14, 69.15, 690, 77, 219/78.13, 85.14, 90, 91.1, 96
See application file for complete search history.

(56) References Cited

U.S. PATENT DOCUMENTS

| 2016/0039045 | A1 | 2/2016 | Webster |
| 2016/0202045 | A1 | 7/2016 | Schönleber et al. |
| 2016/0356595 | A1 | 12/2016 | Lessmueller et al. |
| 2017/0326669 | A1 | 11/2017 | Moser et al. |

FOREIGN PATENT DOCUMENTS

| JP | 2016-538134 | 12/2016 |
| JP | 2018-501964 | 1/2018 |
| WO | 2014/132503 | 9/2014 |

OTHER PUBLICATIONS

Office Action dated Jun. 23, 2022 in corresponding Indian Patent Application No. 202047048869.
Extended European Search Report dated Jun. 7, 2021 in European Patent Application No. 19786062.0.
Search Report dated Mar. 23, 2022 in counterpart Chinese Patent Application No. 201980025333.0.
International Search Report dated Jun. 18, 2019 in International (PCT) Application No. PCT/JP2019/011444 with English translation.

* cited by examiner

LASER WELDING METHOD

CROSS-REFERENCE TO RELATED APPLICATIONS

This is a continuation of International Application No. PCT/JP2019/011444 filed on Mar. 19, 2019, which claims priority to Japanese Patent Application No. 2018-077694 filed on Apr. 13, 2018. The entire disclosures of these applications are incorporated by reference herein.

BACKGROUND

The present invention relates to a laser welding method.

Laser welding devices are known that evaluate the quality of weld portions by directly measuring the depth of penetration of the weld portions (see Japanese Unexamined Patent Publication No. 2012-236196, for example).

The laser welding device disclosed in Japanese Unexamined Patent Publication No. 2012-236196 is configured to coaxially align a laser beam with a measurement beam and emit the coaxially aligned beams into a keyhole of a weld portion. The measurement beam is reflected from the bottom of the keyhole and received by an optical interferometer via a beam splitter. Since the optical interferometer can measure the optical path length of the measurement beam, the depth of the keyhole is detected from the measured optical path length and determined to be the depth of penetration of the weld portion.

SUMMARY

However, for example, the beam splitter may be warped due to the heat, thus causing misalignment of optical axes of the laser beam and the measurement beam. In such a case, there is a concern that the depth of the keyhole may not be accurately specified.

Specifically, the cross section of the bottom of the keyhole has a curved shape, where the penetration is shallow, on a fore side portion in the welding direction. If the optical axis of the measurement beam deviates forward in the welding direction from the laser beam, the measurement beam will be emitted not to the deepest portion of the keyhole, but to the curved portion where the penetration is shallower than that of the deepest portion of the keyhole. Therefore, there has been a concern that the depth of the keyhole may be measured to be shallower than the actual deepest portion.

In view of the foregoing background, it is an object of the present invention to more accurately specify the penetration depth of a weld portion.

An aspect of the present disclosure is directed to a laser welding method for welding a weld portion by using a laser beam, and the method has the following solutions.

Specifically, a first aspect of the present disclosure includes: emitting, to the weld portion, the laser beam and a measurement beam coaxially aligned with the laser beam, the measurement beam having a wavelength different from a wavelength of the laser beam; performing laser welding while moving an irradiation position of the laser beam and an irradiation position of the measurement beam in at least a first direction, a second direction opposite to the first direction, a third direction crossing the first direction, or a fourth direction opposite to the third direction; measuring a penetration depth of the weld portion in accordance with the measurement beam reflected on the weld portion during the laser welding; determining an optical axis deviation direction in which an optical axis of the measurement beam deviates from the laser beam, by relatively comparing a plurality of values measured; and adding a predetermined correction value to the values measured during the laser welding when the laser welding is performed in the optical axis deviation direction.

In the first aspect, the irradiation positions of the laser beam and the measurement beam are moved in the first to fourth directions to perform the laser welding, and the penetration depth of the weld portion is measured during the laser welding in each of the directions. Then, a plurality of values measured are relatively compared to determine the optical axis deviation direction, and a correction value is added to the values measured during the laser welding when the laser welding is performed in the optical axis deviation direction.

These configurations reduce variations of the measured values and allow accurate determination of the penetration depth of the weld portion even when the optical axis of the measurement beam deviates from the laser beam.

Specifically, when the optical axis of the measurement beam deviates to the fore side in the welding direction of the laser beam, the measurement beam is not emitted to the deepest portion of the keyhole of the weld portion, but emitted to a portion shallower than the deepest portion. Therefore, the depth shallower than the actual deepest portion of the keyhole is measured.

In view of this, to confirm in which direction the optical axis of the measurement beam deviates from the laser beam, laser welding is performed while moving the irradiation positions of the laser beam and the measurement beam in each of the first to fourth directions at the time, for example, of starting the laser welding device.

As a result, if it is determined, for example, that the optical axis deviates in the first direction, the correction value is added, in the actual laser welding work, to the measured values during the laser welding performed in the first direction that is forward in the welding direction.

For example, when the actual depth of the deepest portion of the keyhole determined in advance through an experiment or the like is 4 mm and a value measured during the movement in the first direction is 3 mm, then the correction value may be set to 1 mm.

As explained, if there is a deviation of the optical axis, a value actually measured during the laser welding shows a shallower depth than the actual depth of the deepest portion of the keyhole. However, addition of the correction value can reduce variations of the measured values.

A second aspect is an embodiment of the first aspect. In the second aspect, in the determining of the optical axis deviation direction, the plurality of values measured are compared with a predetermined reference value, and a direction in which a value smaller than the reference value is measured is determined to be the optical axis deviation direction.

In the second aspect, a direction in which a value smaller than the predetermined reference value is measured is determined to be the optical axis deviation direction.

A third aspect of the present disclosure is an embodiment of the second aspect. In the third aspect, in the determining of the optical axis deviation direction, if the value smaller than the reference value is measured in both of the first direction and the third direction, a direction between the first direction and the third direction is determined to be the optical axis deviation direction.

In the third aspect, when the value smaller than the reference value is measured in both of the first direction and the third direction, a direction between the first direction and the third direction is determined to be the optical axis deviation direction. For example, if the first direction is a forward direction and the third direction is a leftward direction, it is possible to determine that the optical axis of the measurement beam deviates from the laser beam in a left forward direction.

For example, suppose that the actual depth of the deepest portion of the keyhole determined in advance through an experiment or the like is 4 mm, that a value measured during the movement in the first direction is 3.3 mm, and that a value measured during the movement in the third direction is 3.3 mm. If the values measured during the movements in the first direction and the third direction are the same as in this case, it is possible to determine that the optical axis of the measurement beam deviates in a direction forward of and angled 45° leftward from the laser beam.

A fourth aspect of the present disclosure is an embodiment of the third aspect. In the fourth aspect,
  in the determining of the optical axis deviation direction, if a value measured during the movement in the first direction is smaller than a value measured during the movement in the third direction, a direction between the first direction and the third direction closer to the first direction is determined to be the optical axis deviation direction.

In the fourth aspect, when a value measured during the movement in the first direction is smaller than a value measured during the movement in the third direction, a direction between the first direction and the third direction closer to the first direction is determined to be the optical axis deviation direction.

For example, supposed that the first direction is a forward direction, that the third direction is a leftward direction, that the actual depth of the deepest portion of the keyhole determined in advance through an experiment or the like is 4 mm, that a value measured during the movement in the first direction is 3.1 mm, and that a value measured during the movement in the third direction is 3.5 mm. If the value measured during the movement in the first direction is smaller than the value measured during the movement in the third direction as in this case, it is possible to determine that the optical axis of the measurement beam deviates obliquely forward, and angled 30° leftward, from the laser beam.

A fifth aspect of the present disclosure is an embodiment of the fourth aspect. In the fifth aspect,
  in the adding of the correction value, the correction value added to the value measured during the movement in the first direction is greater than the correction value added to the value measured during the movement in the third direction.

In the fifth aspect, a correction value added to a value measured during the movement in the first direction is set to be greater than a correction value added to a value measured during the movement in the third direction.

For example, in a case in which: the actual depth of the deepest portion of the keyhole determined in advance through an experiment or the like is 4 mm; a value measured during the movement in the first direction is 3.1 mm; and a value measured during the movement in the third direction is 3.5 mm, then the correction value for the first direction may be 0.9 mm, and the correction value for the third direction may be 0.5 mm.

A sixth aspect of the present disclosure is an embodiment of any one of the first to fifth aspects. In the sixth aspect,
  in the determining of the optical axis deviation direction, the values measured are compared with the reference value in accordance with a table storing a plurality of reference values determined according to output of the laser beam and a welding speed.

In the sixth aspect, the reference value used for comparison with the measured values is determined in accordance with the output of the laser beam and the welding speed, and is stored in the table. Therefore, at a time of comparing the measured values with the reference value, the reference value corresponding to the conditions for welding can be looked up from the table.

A seventh aspect of the present disclosure is an embodiment of the first aspect. In the seventh aspect,
  in the determining of the optical axis deviation direction, a direction in which a value smallest among the plurality of values measured is measured is determined to be the optical axis deviation direction.

In the seventh aspect, a direction in which the value smallest (shallowest depth) is measured is determined to be the optical axis deviation direction.

An eighth aspect of the present disclosure is an embodiment of any one of the first to seventh aspects. In the eighth aspect,
  in the adding of the correction value, the correction value used is a difference between a value greatest among the plurality of values measured and a value measured during the laser welding in the optical axis deviation direction.

In the eighth aspect, the difference between a value greatest (deepest depth) among the plurality of values measured and a measured value obtained during the movement in the optical axis deviation direction is used as the correction value.

A ninth aspect of the present disclosure is an embodiment of any one of the first to seventh aspects. In the ninth aspect,
  in the adding of the correction value, the correction value used is a difference between a value measured during the laser welding in a direction opposite to the optical axis deviation direction and a value measured during the laser welding in the optical axis deviation direction.

In the ninth aspect, the difference between the value measured during the movement in the direction opposite to the optical axis deviation direction and the value measured during the movement in the optical axis deviation direction is used as the correction value.

The above aspects of the present disclosure enable accurate specification of the penetration depth of a weld portion.

DETAILED DESCRIPTION

Embodiments of the present invention will be described in detail with reference to the drawings. Note that the following description of embodiments is merely an example in nature, and is not intended to limit the scope, applications, or use of the present invention.

Figure 1:
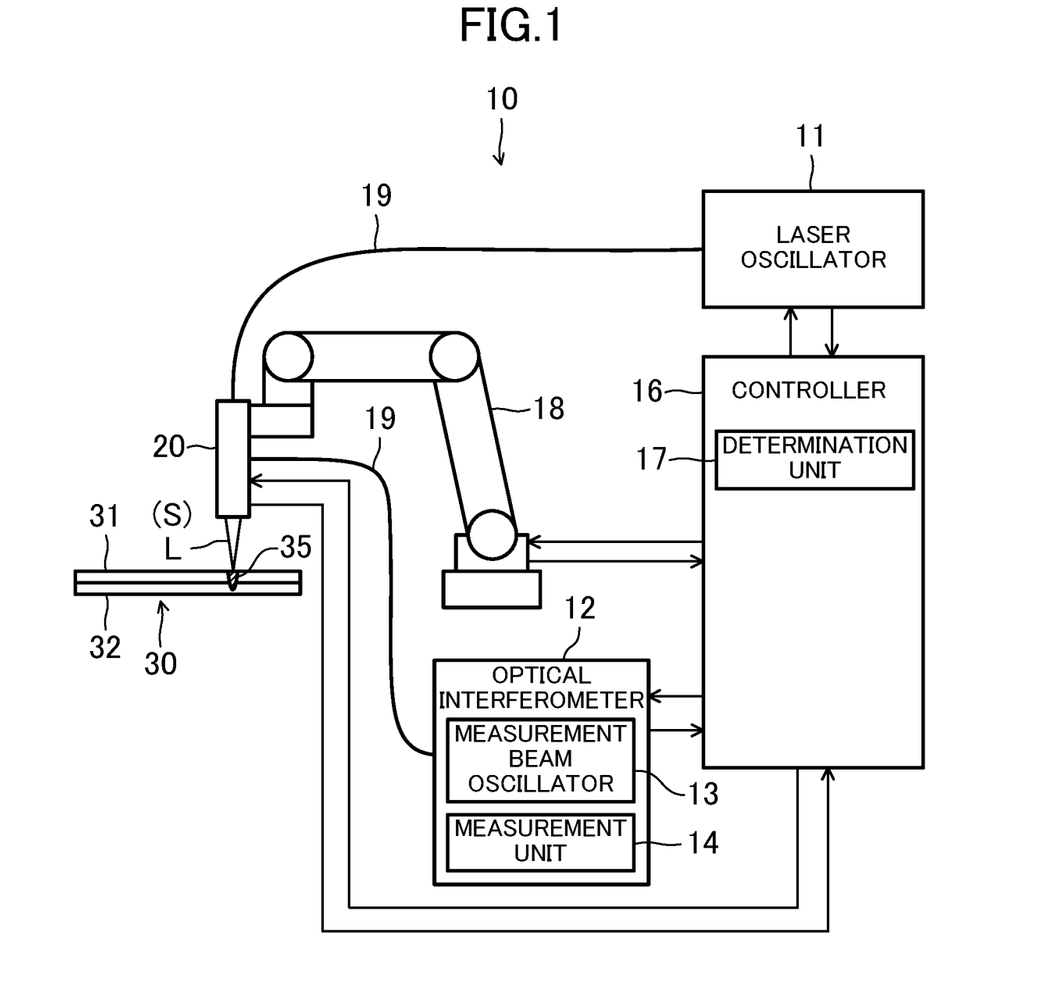
FIG. 1 is a schematic view of a laser welding device in accordance with an embodiment.

As illustrated in FIG. 1, a laser welding device 10 includes a laser oscillator 11 configured to output a laser beam L, an optical interferometer 12 configured to output a measurement beam S, a laser emitting head 20 (irradiation unit) configured to emit the laser beam L and the measurement beam S to a welding target 30, a robot 18 to which the laser emitting head 20 is attached and which is configured to carry the laser emitting head 20, and a controller 16 configured to control the operations of the laser emitting head 20 and the robot 18 to perform laser welding.

The laser oscillator 11 outputs the laser beam L based on an instruction from the controller 16. The laser oscillator 11 and the laser emitting head 20 are connected via an optical fiber 19. The laser beam L is transmitted from the laser oscillator 11 to the laser emitting head 20 through the optical fiber 19.

The optical interferometer 12 includes a measurement beam oscillator 13 configured to output the measurement beam S having a wavelength different from the wavelength of the laser beam L and a measurement unit 14 configured to measure the depth of penetration of a weld portion 35 to be described later. The measurement beam oscillator 13 outputs the measurement beam S based on an instruction from the controller 16. The optical interferometer 12 and the laser emitting head 20 are connected via an optical fiber 19. The measurement beam S is transmitted from the optical interferometer 12 to the laser emitting head 20 through the optical fiber 19.

The laser emitting head 20 is attached to a distal end of an arm of the robot 18. The laser emitting head 20 focuses the laser beam L and the measurement beam S on the welding target 30 based on an instruction from the controller 16.

The robot 18 moves the laser emitting head 20 based on an instruction from the controller 16 to a position as instructed, at which the laser beam L and the measurement beam S are emitted for scanning.

The controller 16 is connected to the laser oscillator 11, the optical interferometer 12, and the robot 18. The controller 16 has a function of controlling the travel speed of the laser emitting head 20 and has functions of controlling when to start or stop the output of the laser beam L and controlling an output intensity of the laser beam L. As will be described in detail later, the controller 16 has a determination unit 17 that determines the penetration depth of the weld portion 35 in accordance with a plurality of measured values obtained by the measurement unit 14.

The welding target 30 includes an upper metal plate 31 and a lower metal plate 32 that are overlapping in the vertical direction. The laser welding device 10 welds the upper metal plate 31 and the lower metal plate 32 by emitting the laser beam L to the upper surface of the upper metal plate 31.

The laser welding device 10 according to the first embodiment can measure the depth of penetration of the weld portion 35 while performing laser welding.

Figure 2:
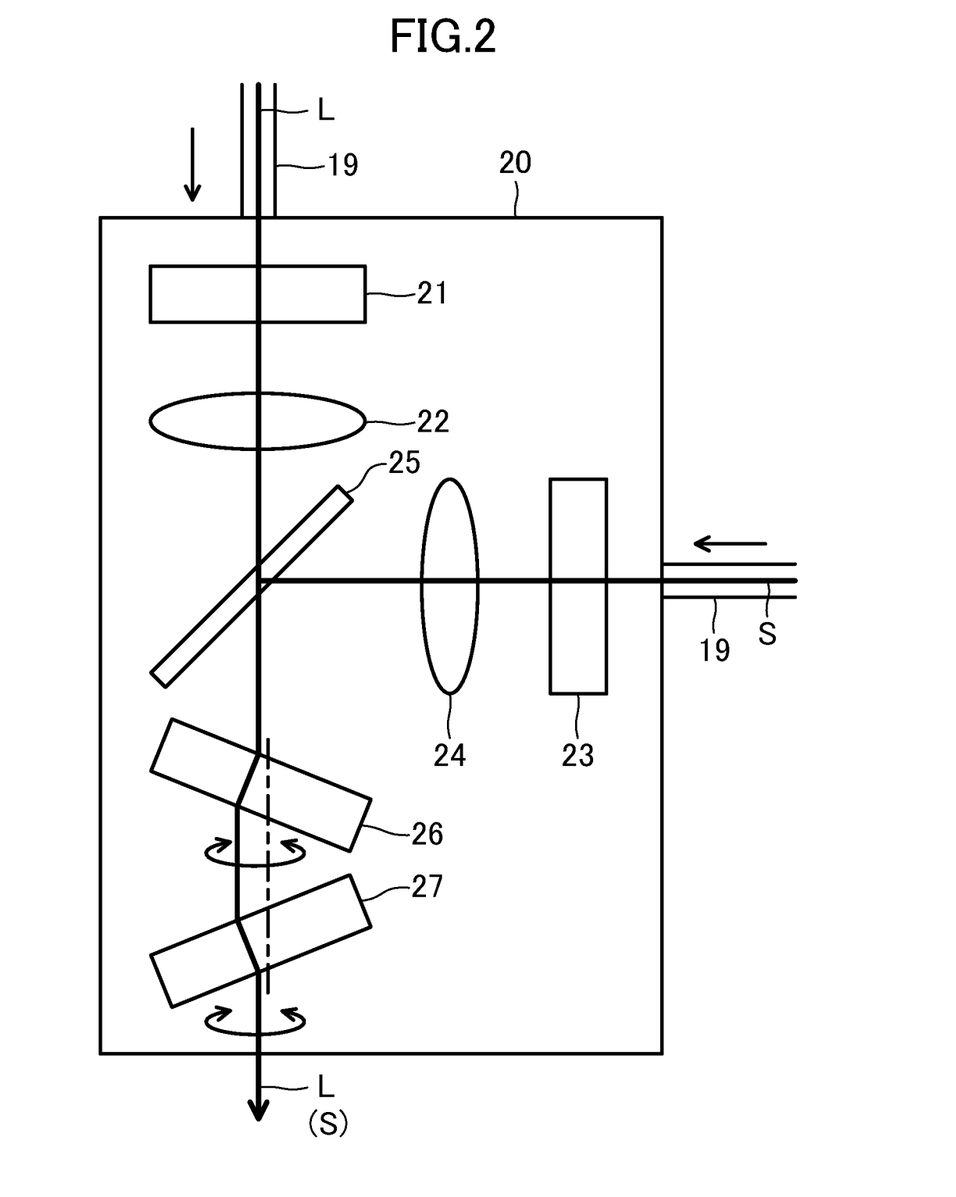
FIG. 2 is a schematic view illustrating a configuration of a laser emitting head.

Specifically, as illustrated in FIG. 2, the laser emitting head 20 includes: a first collimating lens 21 and a first focus lens 22 through which the laser beam L passes; a second collimating lens 23 and a second focus lens 24 through which the measurement beam S passes; a beam splitter 25 that combines the laser beam L and the measurement beam S into a coaxial light beam; a first parallel plate 26; and a second parallel plate 27.

The beam splitter 25 is a dichroic mirror configured to transmit or reflect a beam having a predetermined wavelength and is configured to transmit the laser beam L from the laser oscillator 11 and reflect the measurement beam S from the optical interferometer 12.

In one preferred embodiment, the difference between the wavelength of the laser beam L and the wavelength of the measurement beam S is 100 nm or more to sufficiently separate the laser beam L from the measurement beam S with the beam splitter 25.

The first parallel plate 26 and the second parallel plate 27 are connected to a motor (not shown), and are rotated in accordance with an instruction from the controller 16.

The laser beam L output from the laser oscillator 11 passes through the optical fiber 19 to the laser emitting head 20. The laser beam L having entered the laser emitting head 20 is collimated by the first collimating lens 21 and focused by the first focus lens 22. The laser beam L focused by the first focus lens 22 passes through the beam splitter 25.

Meanwhile, the measurement beam S output from the optical interferometer 12 passes through the optical fiber 19 to the laser emitting head 20. The measurement beam S having entered the laser emitting head 20 is collimated by the second collimating lens 23 and focused by the second focus lens 24. The measurement beam S is then concentrically and coaxially aligned with the laser beam L by the beam splitter 25.

Note that the second focus lens 24 also has a function of causing the measurement beam S reflected on the weld portion 35 to enter the optical interferometer 12 again, via the beam splitter 25.

The laser beam L and the measurement beam S coaxially aligned with each other pass through the first parallel plate 26 and the second parallel plate 27 controlled by the controller 16, at which the irradiation position (focal length) of the laser beam L and the measurement beam S is determined, and the laser beam L and the measurement beam are emitted to the weld portion 35 of the welding target 30.

In this case, in the laser emitting head 20, the first parallel plate 26 and the second parallel plate 27 are rotated to rotate the laser beam L and the measurement beam S along circular trajectories, whereby the laser beam L and the measurement beam S can be rotationally moved. That is, the first parallel plate 26 and the second parallel plate 27 serve as an irradiation position changer that is capable of changing the irradiation positions of the laser beam L and the measurement beam S.

Since the robot 18 moves the laser emitting head 20, the irradiation position of the laser beam L and the measurement beam S can be moved in a welding region on the welding target 30.

Figure 3:
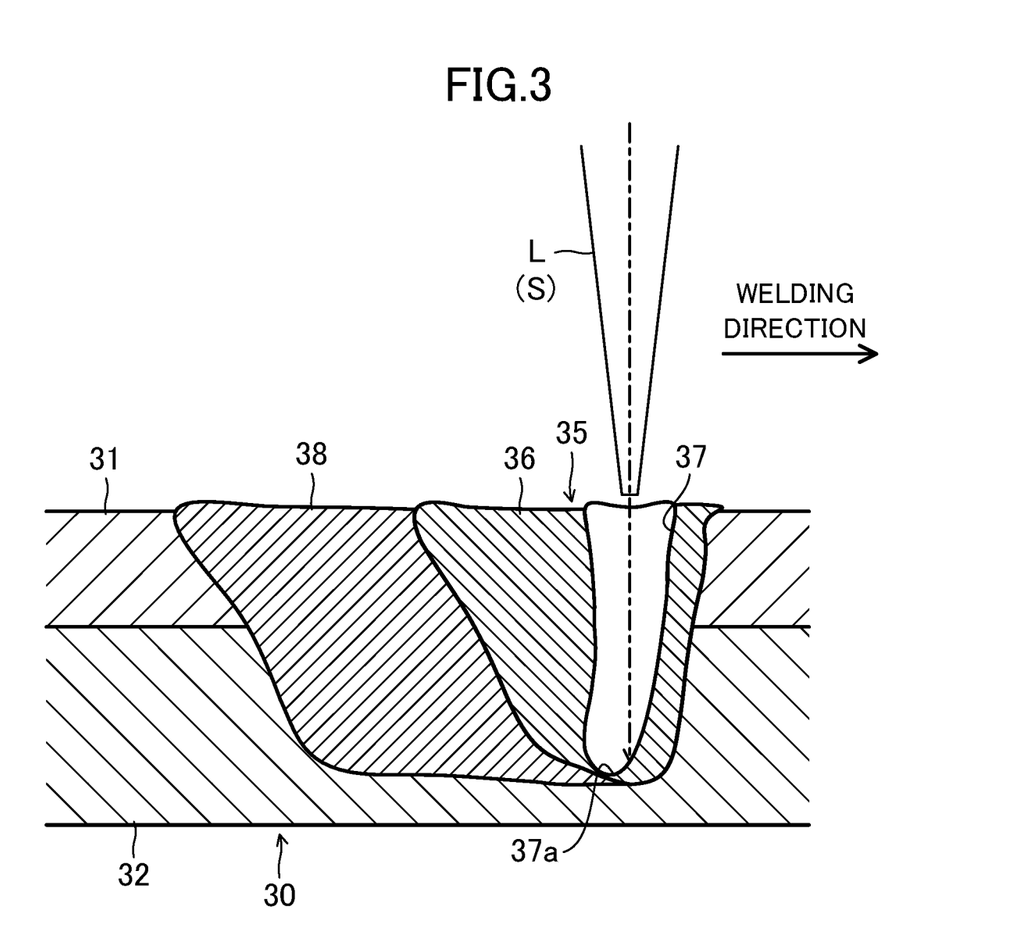
FIG. 3 is a side-sectional view illustrating a positional relation among the laser beam, the measurement beam, and a keyhole.

As illustrated in FIG. 3, in welding the weld portion 35 of the welding target 30 including the upper metal plate 31 and the lower metal plate 32, the laser welding device 10 emits the laser beam L to the upper surface of the upper metal plate 31 from above the welding target 30.

The weld portion 35 irradiated with the laser beam L is melted from an upper portion, and a weld puddle 36 is formed in the weld portion 35. When the weld portion 35 is melted, molten metal in the weld puddle 36 vaporizes and the vaporizing metal generates vapor pressure to form a keyhole 37. In this example, the weld portion 35 includes both weld puddle 36 and keyhole 37. A solidified portion 38 is formed behind the weld puddle 36 in the welding direction when the weld puddle 36 is solidified.

The measurement beam S output from the optical interferometer 12 is concentrically and coaxially aligned, by the beam splitter 25, with the laser beam L output from the laser oscillator 11, and then emitted into the keyhole 37. The emitted measurement beam S is reflected from a bottom 37a of the keyhole 37 and enters the optical interferometer 12 via the beam splitter 25.

The optical path length of the measurement beam S entering the optical interferometer 12 is measured by the measurement unit 14. The measurement unit 14 determines the depth of the keyhole 37 from the optical path length measured, as the penetration depth of the weld portion 35. The laser welding device 10 determines the quality of the weld portion 35 based on the determined depth of penetration.

With the above-described configuration, the laser welding device 10 can measure the depth of penetration while performing the laser welding.

However, for example, the beam splitter 25 may be warped due to the heat, thus causing misalignment of optical axes of the laser beam L and the measurement beam S. When such a misalignment of optical axes of the laser beam L and the measurement beam S occurs, the optical interferometer 12 may determine the depth of the keyhole 37 to be shallower than the actual depth and may fail to accurately measure the penetration depth.

Specifically, the keyhole 37 is formed by a vapor pressure generated when the metal in the weld portion 35 melts and evaporates. The shape of the formed keyhole 37 varies depending on the period of irradiation with the laser beam L and the state of the weld puddle 36.

The faster the moving speed (welding speed) of the laser emitting head 20 becomes, the more rearward the interior wall of the keyhole 37 on the fore side in the welding direction tends to curve. Therefore, in one preferred embodiment, the laser welding speed is suitably set to reduce the curvature of the curved portion of the bottom 37a of the keyhole 37.

However, despite a suitable setting of the laser welding speed, it is difficult to make the opening diameter of the keyhole 37 and the hole diameter of the bottom 37a substantially equal to each other, and the interior wall of the keyhole 37 on the fore side in the welding direction may have a curved portion where the penetration is shallow.

Figure 4:
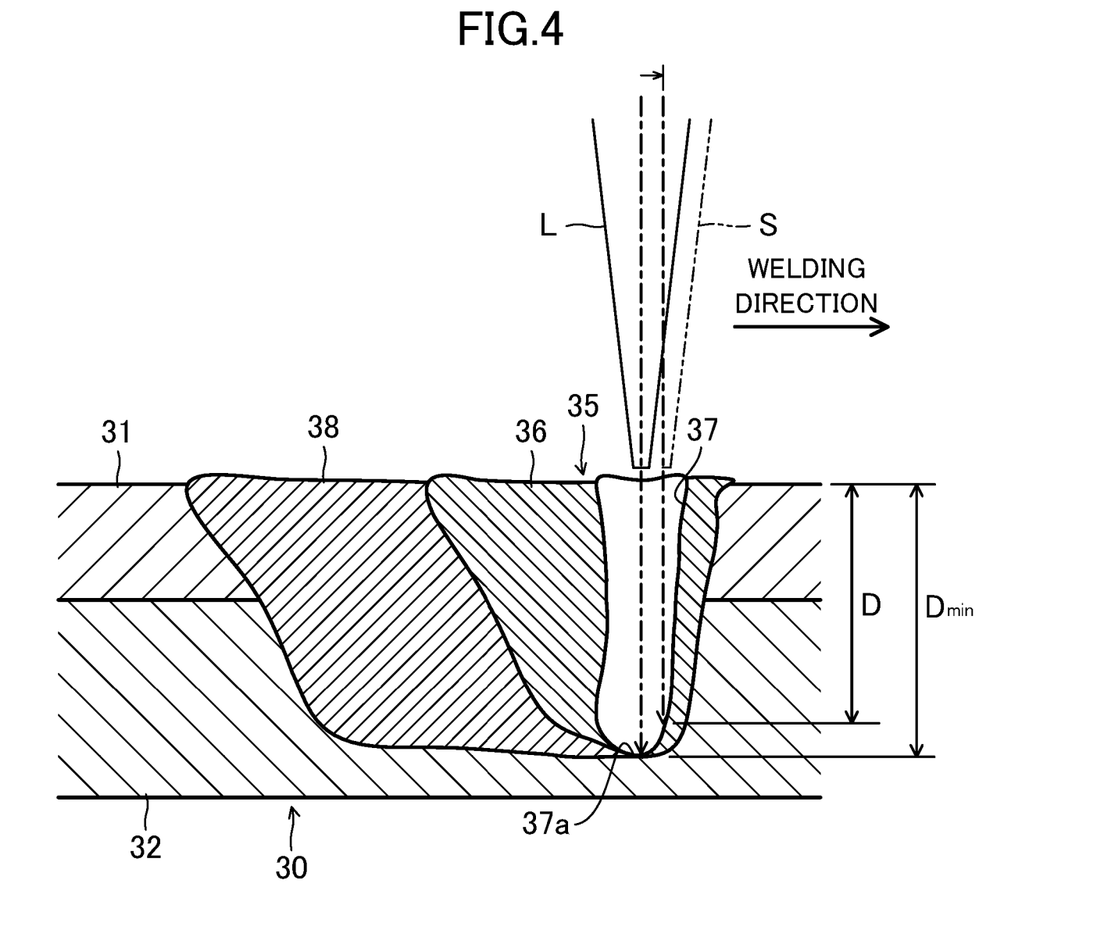
FIG. 4 is a side-sectional view illustrating a positional relation among the laser beam, the measurement beam, and a keyhole, when a deviation of an optical axis of the measurement beam occurs.

Thus, if the optical axis of the measurement beam S deviates forward in the welding direction from the laser beam L, as indicated by imaginary lines in FIG. 4, the position of the bottom 37a of the keyhole 37 and the center position of the spot of the measurement beam S do not coincide with each other, which may result in that the measurement beam S is not emitted to the bottom 37a.

In a state where the measurement beam S is not emitted to the bottom 37a (e.g., in a state where the optical axis of the measurement beam S deviates forward in the welding direction from the laser beam L, and the measurement beam S is emitted to the fore side interior wall of the keyhole 37), the optical interferometer 12 measures, as the position of the bottom 37a, the position where the measurement beam S is reflected and determines the measured depth as the depth of the keyhole 37.

That is, if the measurement beam S is not emitted to the bottom 37a, the optical interferometer 12 determines the depth of the keyhole 37 to be shallower than the actual depth. In the example shown in FIG. 4, the depth D that is shallower than the actual depth Dmin of the keyhole 37 is measured. The weld portion 35 cannot be accurately inspected if the depth of the keyhole 37 is determined to be shallower than the actual depth.

The following describes how the penetration depth of the weld portion 35 varies, i.e., how the measured depth of the keyhole 37 varies, between the states where there is misalignment of the optical axes and there is not.

In the example shown in FIG. 4, the thickness of the upper metal plate 31 is 1 mm; the thickness of the lower metal plate 32 is 4.3 mm; and the optical axis of the measurement beam S is deviated 100 μm forward in the welding direction from the optical axis of the laser beam L.

Figure 5:
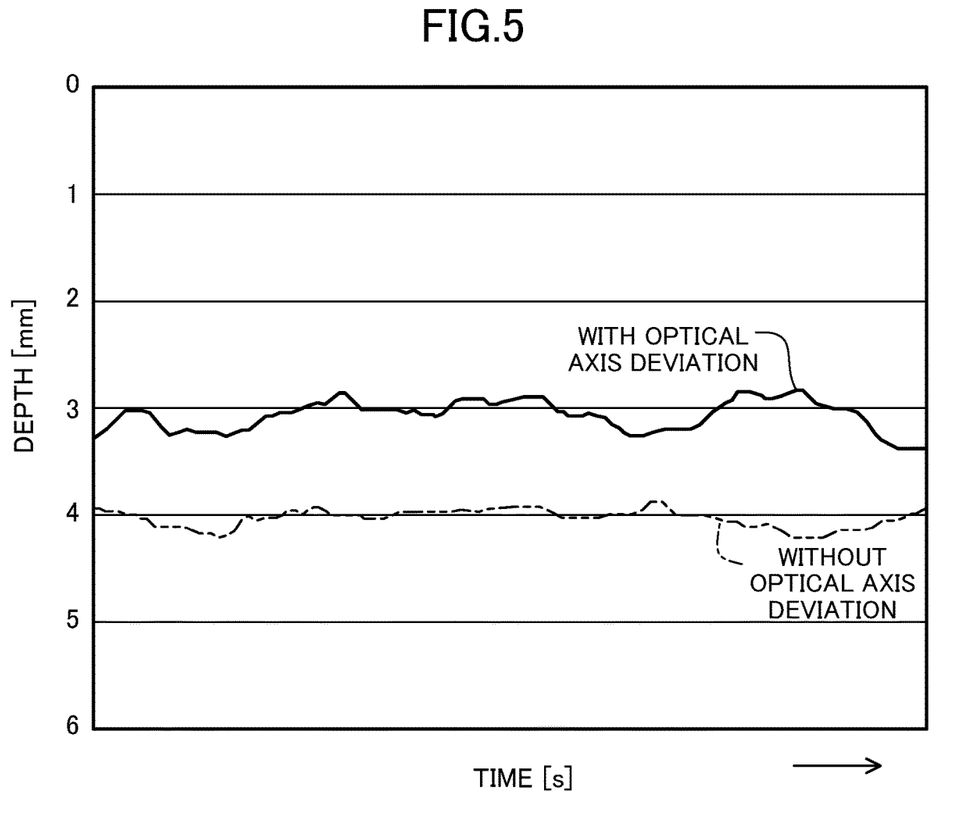
FIG. 5 is a graph comparing a penetration depth measured when the deviation in the optical axis does not occur, with a penetration depth measured when the deviation in the optical axis occurs.

FIG. 5 is a graph illustrating the resulting depth of the keyhole 37, which is the penetration depth of the weld portion 35 from the surface of the welding target 30 or from an imaginary surface serving as the reference. As illustrated in FIG. 5, when the penetration depth is measured while the irradiation positions are moved in a direction in which the optical axis of the measurement beam S deviates, the measured values of the depth of the keyhole 37 are around 3 mm. On the other hand, when the optical axes are not misaligned, the measured values of the depth of the keyhole 37 are around 4 mm.

Note that the measured values become small (shallow) when the optical axis of the measurement beam S deviates forward in the welding direction from the laser beam L. Therefore, when the optical axis of the measurement beam S deviates rearward, or to the right or left in relation to the welding direction from the laser beam L, then the measured values of the depth of the keyhole 37 will be around 4 mm.

In view of this, in the present embodiment, to confirm in which direction the optical axis of the measurement beam S deviates from the laser beam L, laser welding is performed while moving the irradiation positions of the laser beam L and the measurement beam S forward, rearward, leftward, and rightward at the time, for example, of starting the laser welding device 10.

Figure 6:
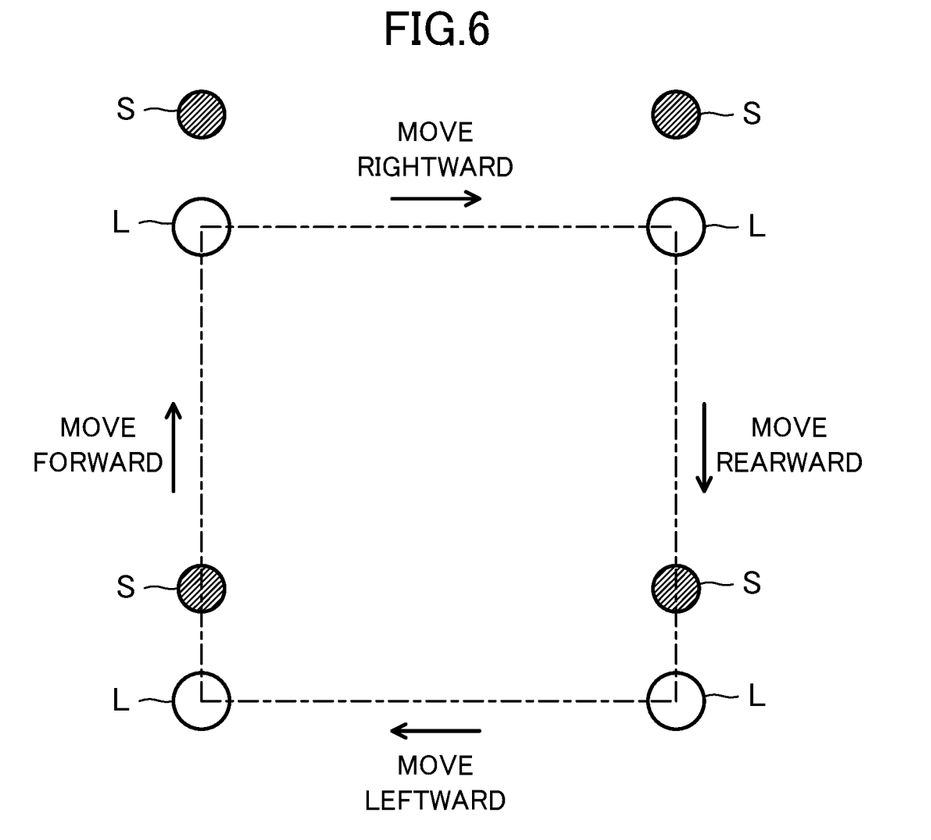
FIG. 6 is a diagram illustrating a positional relation between a direction in which the optical axis of the measurement beam deviates from the laser beam and the forward, rearward, leftward and rightward directions in which the laser beam and the measurement beam are moved.

As illustrated in FIG. 6, the laser welding device 10 welds the welding target 30 by emitting the laser beam L and the measurement beam S to the welding target 30 while moving the irradiation positions of the laser beam L and the measurement beam S in four directions, i.e., first to fourth directions. In the following description, the first direction is a forward direction; a second direction is the rearward direction; a third direction is a leftward direction, and the fourth direction is a rightward direction. In the example illustrated in FIG. 6, the optical axis of the measurement beam S deviates 100 μm forward from the laser beam L.

The laser welding device 10 performs laser welding along a rectangular welding path formed by a center line as illustrated in FIG. 6. Specifically, from the lower left corner position of FIG. 6 as the starting point, laser welding is performed while moving the laser beam L and the measurement beam S forward. After the beams reach the upper left corner of FIG. 6, the laser welding is performed while moving the laser beam L and the measurement beam S rightward, backward, and leftward in a similar manner.

In this manner, the irradiation positions of the laser beam L and the measurement beam S are moved in four directions, i.e., the forward, rearward, leftward and rightward directions, to perform the laser welding, and the penetration depth of the weld portion 35 is measured during the laser welding in each of the directions.

Then, the determination unit 17 determines a deviation direction of the optical axis of the measurement beam S by comparing a plurality of measured values obtained during the laser welding with a predetermined reference value. The predetermined reference value is, for example, a value indicating a penetration depth determined in advance according to the output of the laser beam L and the welding speed. In other words, the predetermined reference value is a value of a depth of the keyhole 37, which is the penetration depth determined in advance according to the output of the laser beam L and the welding speed through an experiment or the like. The predetermined reference value is stored in the determination unit 17 as a table.

Since the depth of the deepest portion of the keyhole 37 is 4 mm in the present embodiment, the reference value may be set to 4 mm or, for example, approximately 3.8 mm in consideration of variations in the measured values.

In the example illustrated in FIG. 6, when the laser welding is performed while moving the laser beam L and the measurement beam S forward, the measured value is around 3 mm and smaller than the reference value. On the other hand, when the laser welding is performed while moving the laser beam L and the measurement beam S rightward, rearward, and leftward, the measured value is around 4 mm and is therefore not smaller than the reference value.

Thus, even if the deviation direction of the optical axis of the measurement beam S from the laser beam L is unknown at a time of, for example, starting the laser welding device 10, it is possible to determine, by comparing the plurality of measured values with the reference value, that a direction in which a value smaller than the reference value is measured is the optical axis deviation direction in which the optical axis of the measurement beam S deviates from the laser beam L.

Then, when the laser welding is actually started after determining the optical axis deviation direction, a predetermined correction value is added to the measured values obtained in the laser welding performed while the laser beam L and the measurement beam S are moved forward.

Specifically, the actual depth of the keyhole 37 is 4 mm, whereas the measured value obtained while the laser beam L and the measurement beam S are moved forward is 3 mm. Therefore, a value corresponding to the difference, that is, 1 mm, may be added as the correction value to the measured values.

Figure 7:
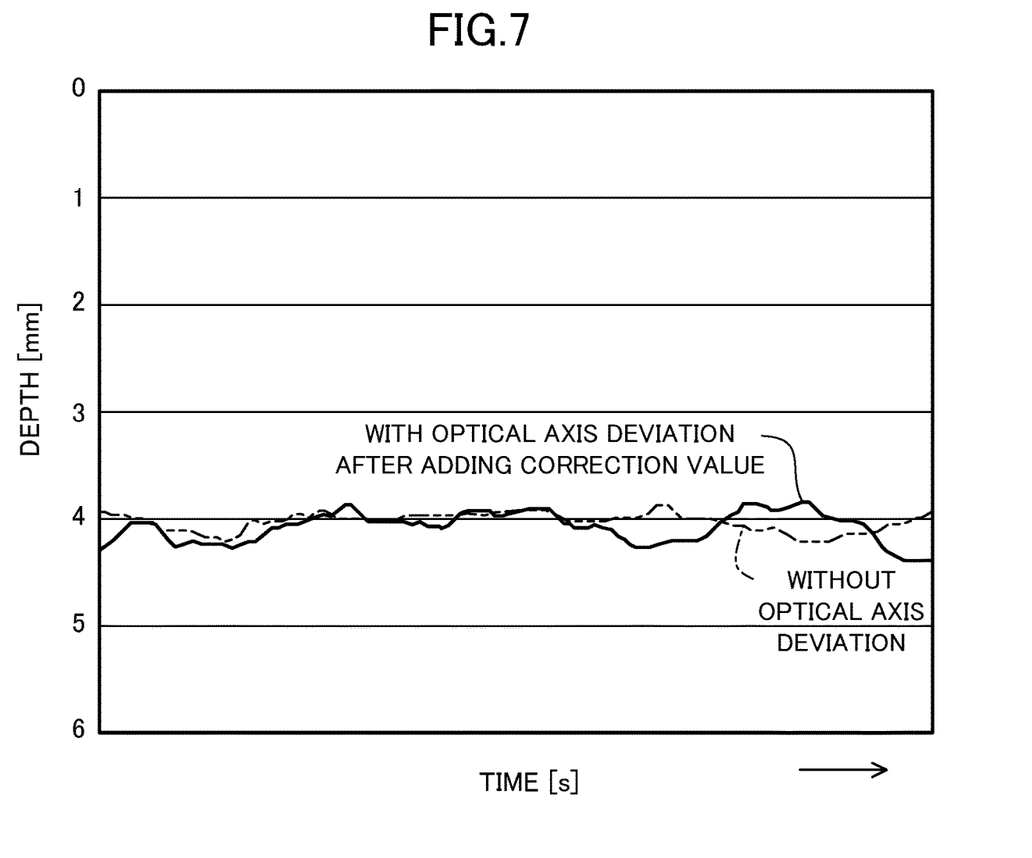
FIG. 7 is a graph comparing a penetration depth measured when the deviation in the optical axis does not occur, with a penetration depth measured when the deviation in the optical axis occurs and a correction value has been added to the measured values.

The correction value is added to the measured values obtained while the laser beam L and the measurement beam S are moved forward, and the measured value after the addition of the correction value thereto is around 4 mm, as illustrated in FIG. 7. As a result, variations of measured values can be reduced.

It should be noted that it is not necessary to add the correction value to the measured values obtained while the laser beam L and the measurement beam S move rightward, rearward, or leftward, because these measured values are around 4 mm.

Figure 8:
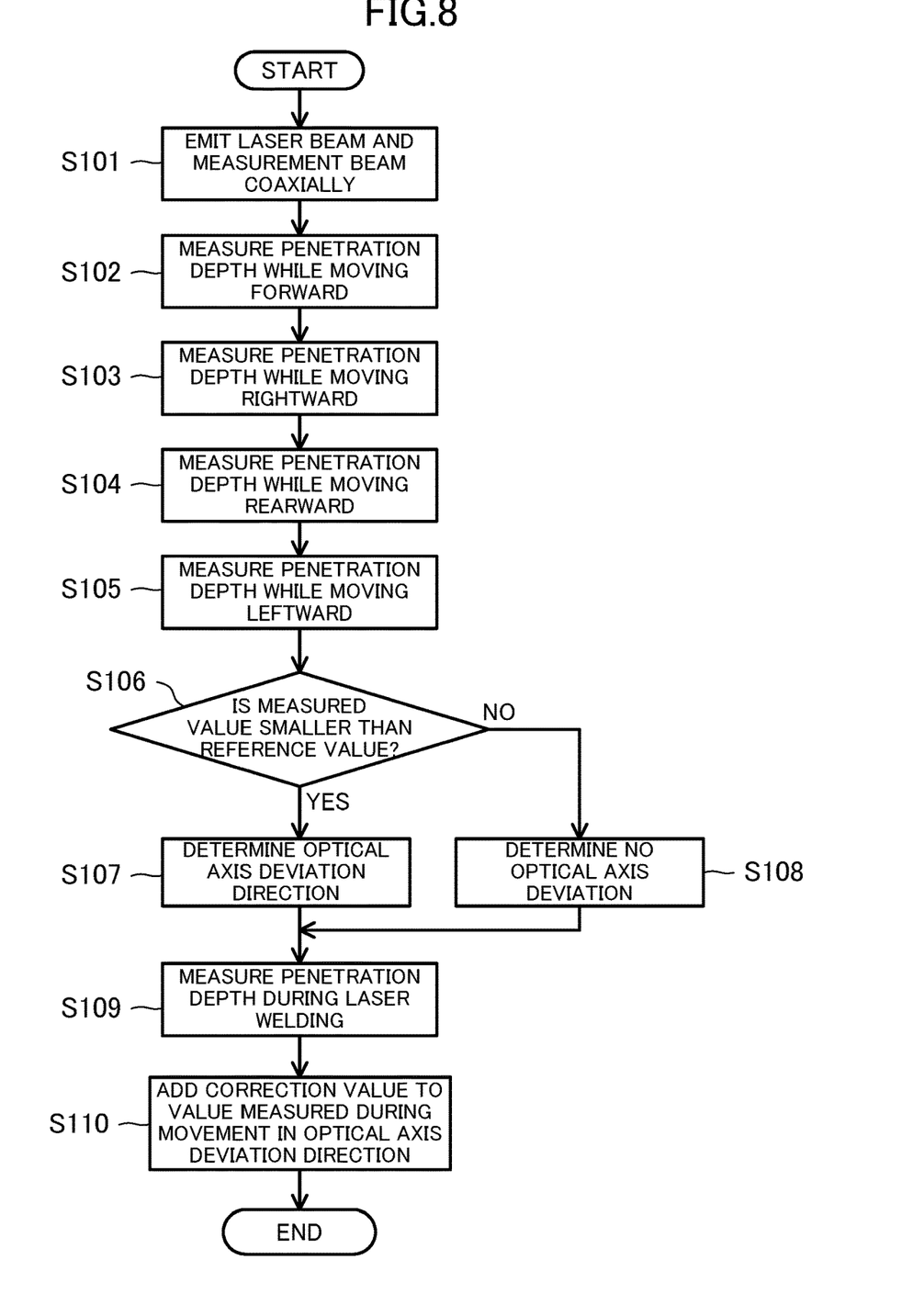
FIG. 8 is a flowchart illustrating a process of measuring the penetration depth of a weld portion.

The following describes a process of measuring the penetration depth of the weld portion 35 with reference to the flowchart of FIG. 8. As illustrated in FIG. 8, at Step S101, the laser beam L and the measurement beam S are coaxially aligned with each other in the laser emitting head 20, and the laser emitting head 20 emits the coaxially aligned beams to the weld portion 35. The process proceeds to Step S102.

In step S102, while the irradiation positions of the laser beam L and the measurement beam S are moved forward, the penetration depth of the weld portion 35 is measured in accordance with the measurement beam S reflected on the weld portion 35. The process proceeds to step S103.

In step S103, while the irradiation positions of the laser beam L and the measurement beam S are moved rightward, the penetration depth of the weld portion 35 is measured in accordance with the measurement beam S reflected on the weld portion 35. The process proceeds to step S104.

In step S104, while the irradiation positions of the laser beam L and the measurement beam S are moved rearward, the penetration depth of the weld portion 35 is measured in accordance with the measurement beam S reflected on the weld portion 35. The process proceeds to step S105.

In step S105, while the irradiation positions of the laser beam L and the measurement beam S are moved leftward, the penetration depth of the weld portion 35 is measured in accordance with the measurement beam S reflected on the weld portion 35. The process proceeds to step S106.

In step S106, the determination unit 17 determines whether the plurality of measured values obtained while the irradiation positions are moved forward, rearward, leftward, and rightward are smaller than a predetermined reference value. If it is YES in step S106, the process proceeds to step S107 If it is NO in step S106, the process proceeds to step S108.

In step S107, a direction in which a value smaller than the reference value is measured is determined to be the optical axis deviation direction in which the optical axis of the measurement beam S deviates from the laser beam L. The process proceeds to step S109.

In step S108, it is determined the optical axes do not deviate from each other, and the process proceeds to step S109.

In step S109, the penetration depth of the weld portion 35 of the welding target 30 is measured while performing laser welding to the weld portion 35. The process proceeds to step S110.

In step S110, the correction value is added to the measured values obtained during the laser welding in the optical axis deviation direction, and the process is ended.

In this manner, variation of the measured values can be reduced even if the optical axis of the measurement beam S deviates from the laser beam L, which allows accurate determination of the penetration depth of the weld portion 35.

First Variation

Figure 9:
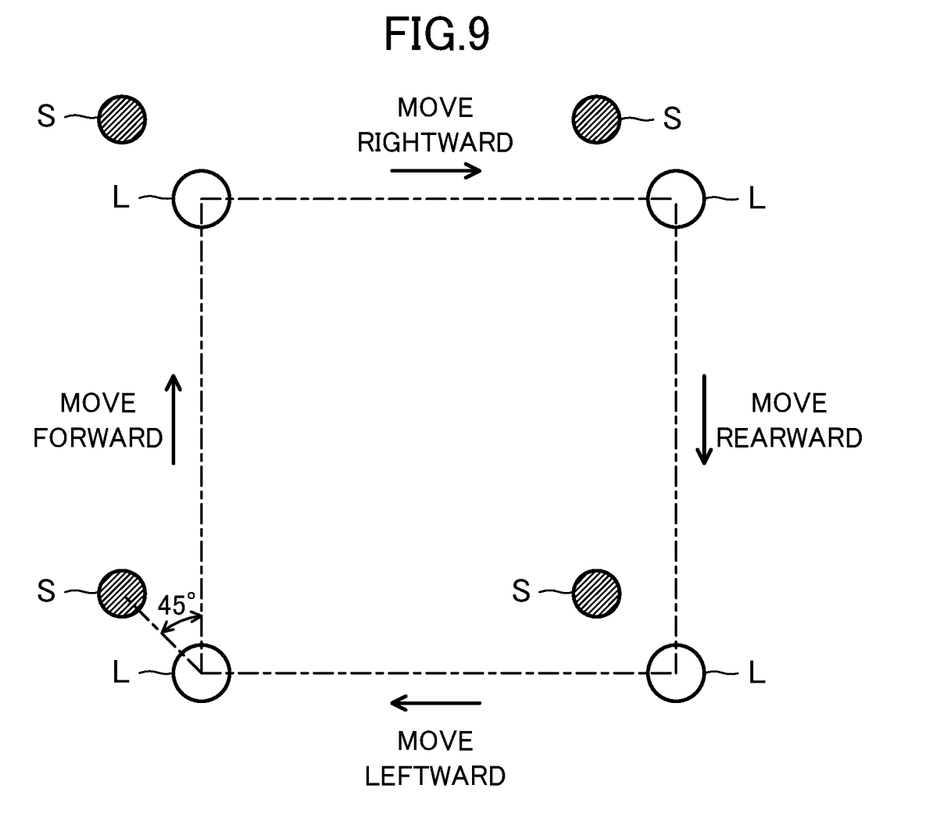
FIG. 9 is a diagram of a first variation and illustrates a positional relation between a direction in which the optical axis of the measurement beam deviates from the laser beam and the forward, rearward, leftward and rightward directions in which the laser beam and the measurement beam are moved.

FIG. 9 is a diagram of a first variation and illustrates a positional relation between a direction in which the optical axis of the measurement beam deviates from the laser beam and the forward, rearward, leftward and rightward directions in which the laser beam and the measurement beam are moved. In the example illustrated in FIG. 9, the optical axis of the measurement beam S deviates 100 μm in a direction forward of and angled 45° leftward from the laser beam L.

The laser welding device 10 performs laser welding along a rectangular welding path formed by a center line as illustrated in FIG. 9. Specifically, from the lower left corner position of FIG. 9 as the starting point, laser welding is performed while moving the laser beam L and the measurement beam S forward. After the beams reach the upper left corner of FIG. 9, the laser welding is performed while moving the laser beam L and the measurement beam S rightward, backward, and leftward in a similar manner.

In this manner, the irradiation positions of the laser beam L and the measurement beam S are moved in four directions, i.e., the forward, rearward, leftward and rightward directions, to perform the laser welding, and the penetration depth of the weld portion 35 is measured during the laser welding in each of the directions.

In the example illustrated in FIG. 9, during the laser welding in which the laser beam L and the measurement beam S are moved forward and leftward, the measurement beam S is emitted to a position on the fore side of the laser beam L in the welding direction. This means that values measured during the forward movement and the leftward movement are smaller than a reference value.

Thus, even if the deviation direction of the optical axis of the measurement beam S from the laser beam L is unknown at a time of, for example, starting the laser welding device 10, it is possible to determine in which direction deviation of the optical axis occurs.

For example, suppose that the actual depth of the deepest portion of the keyhole 37 determined in advance through an experiment or the like is 4 mm, that a measured value obtained during the forward movement is 3.3 mm, and that a measured value obtained during the leftward movement is 3.3 mm. If the measured values obtained during the forward and leftward movements are the same as in this case, it is possible to determine that the optical axis of the measurement beam S deviates in a direction forward of and angled 45° leftward from the laser beam L.

Then, when the laser welding is actually started after determining the optical axis deviation direction, a predetermined correction value is added to the measured values obtained in the laser welding performed while the laser beam L and the measurement beam S are moved forward and leftward.

Specifically, the actual depth of the keyhole 37 is 4 mm, whereas the measured values obtained while the laser beam L and the measurement beam S are moved forward and leftward are 3.3 mm. Therefore, a value corresponding to the difference, that is, 0.7 mm, may be added as the correction value to the measured values.

Second Variation

Figure 10:
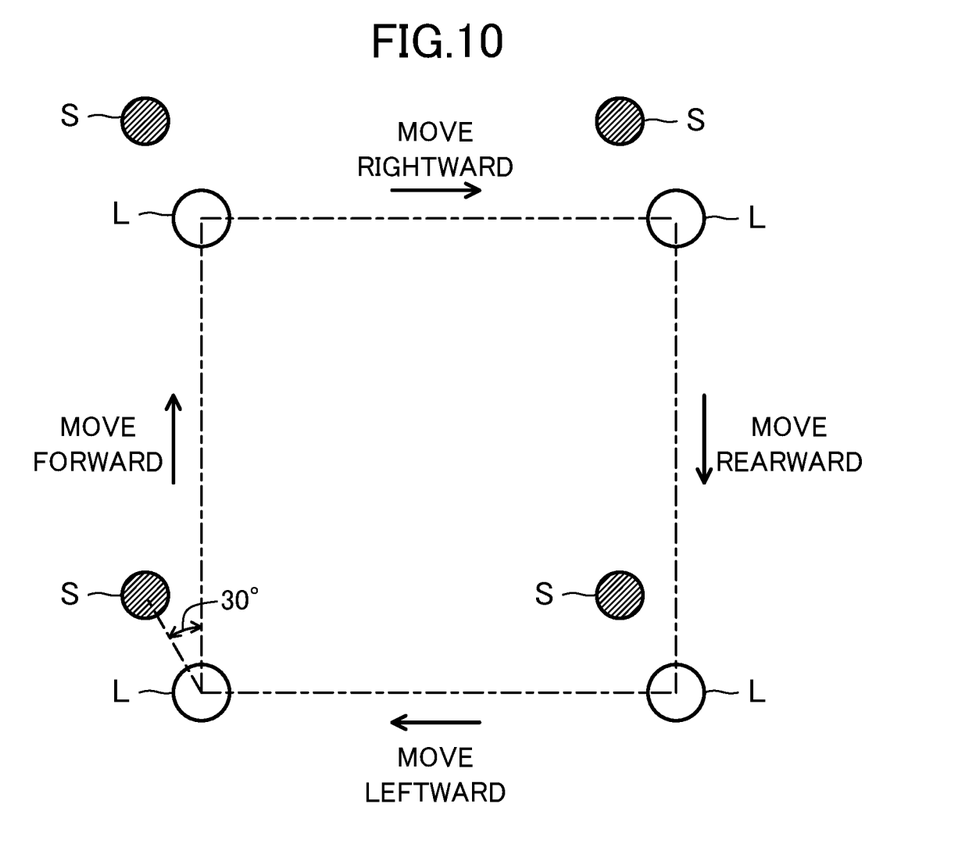
FIG. 10 is a diagram of a second variation and illustrates a positional relation between a direction in which the optical axis of the measurement beam deviates from the laser beam and the forward, rearward, leftward and rightward directions in which the laser beam and the measurement beam are moved.

FIG. 10 is a diagram of a second variation and illustrates a positional relation between a direction in which the optical axis of the measurement beam deviates from the laser beam and the forward, rearward, leftward and rightward directions in which the laser beam and the measurement beam are moved. In the example illustrated in FIG. 10, the optical axis of the measurement beam S deviates 100 μm in a direction forward of and angled 30° leftward from the laser beam L.

The laser welding device 10 performs laser welding along a rectangular welding path formed by a center line as illustrated in FIG. 10. Specifically, from the lower left corner position of FIG. 10 as the starting point, laser welding is performed while moving the laser beam L and the measurement beam S forward. After the beams reach the upper left corner of FIG. 10, the laser welding is performed while moving the laser beam L and the measurement beam S rightward, backward, and leftward in a similar manner.

In this manner, the irradiation positions of the laser beam L and the measurement beam S are moved in four directions, i.e., the forward, rearward, leftward and rightward directions, to perform the laser welding, and the penetration depth of the weld portion 35 is measured during the laser welding in each of the directions.

In the example illustrated in FIG. 10, during the laser welding in which the laser beam L and the measurement beam S are moved forward and leftward, the measurement beam S is emitted to a position on the fore side of the laser beam L in the welding direction. This means that values measured during the forward movement and the leftward movement are smaller than a reference value.

Thus, even if the deviation direction of the optical axis of the measurement beam S from the laser beam L is unknown at a time of, for example, starting the laser welding device 10, it is possible to determine in which direction deviation of the optical axis occurs.

For example, suppose that the actual depth of the deepest portion of the keyhole 37 determined in advance through an experiment or the like is 4 mm, that a measured value obtained during the forward movement is 3.1 mm, and that a measured value obtained during the leftward movement is 3.5 mm. If, as in this case, the measured value obtained during the forward movement is smaller than the measured value obtained during the leftward movement, it is possible to determine, in accordance with the ratio between the measured values, that the optical axis of the measurement beam S deviates in a left forward direction closer to the forward direction with respect to the laser beam L, that is, in a direction forward of and angled 30° leftward from the laser beam L.

Then, when the laser welding is actually started after determining the optical axis deviation direction, a predetermined correction value is added to the measured values obtained in the laser welding performed while the laser beam L and the measurement beam S are moved forward and leftward.

Specifically, the actual depth of the keyhole 37 is 4 mm, whereas the measured value obtained while the laser beam L and the measurement beam S are moved forward is 3.1 mm. Therefore, a value corresponding to the difference, that is, 0.9 mm, may be added as the correction value to the measured values. Further, since the measured value obtained while the laser beam L and the measurement beam S are moved leftward is 3.5 mm, a value corresponding to the difference, that is, 0.5 mm, may be added as the correction value to the measured values.

Other Embodiments

The embodiments described above may be modified as follows.

In the present embodiment, in order to determine the optical axis deviation direction, laser welding is performed while the irradiation positions of the laser beam L and the measurement beam S are moved along a rectangular welding path. However, this is a non-limiting example. For example, the irradiation positions may be moved along a welding path of a circular shape or other polygonal shapes. Further, instead of continuously moving the irradiation positions forward, rearward, leftward, and rightward, the irradiation positions may be moved discontinuously. For example, the irradiation positions may be moved in a first direction, and then moved to somewhere else before moving in a second direction or a third direction. Further, the moving direction of the irradiation positions of the laser beam L and the measurement beam S may be clockwise or counterclockwise.

Further, in the present embodiment, a plurality of measured values are compared with a predetermined reference value, and a direction in which a value smaller than the reference value is measured is determined to be the optical axis deviation direction. However, this is a non-limiting example. For example, a direction in which the value smallest (shallowest depth) among the plurality of measured values is measured may be determined to be the optical axis deviation direction.

Further, in the present embodiment, the depth of the keyhole 37, that is, the penetration depth according to the output of the laser beam L and the welding speed, which is obtained in advance through an experiment or the like, is used as a reference value, and the difference between the reference value and the measured value is used as a correction value. However, this is a non-limiting example.

For example, in a case of having no reference value provided in advance, the correction value may be a difference between the value greatest (deepest) among the plurality of measured values and a value measured during the movement in the optical axis deviation direction. Alternatively, the correction value may be a difference between a value measured during the movement in a direction opposite to the optical axis deviation direction and a value measured during the movement in the optical axis deviation direction.

Further, the present embodiment illustrates a configuration that performs laser welding on a stack of two metal plates, i.e., the upper metal plate 31 and the lower metal plate 32. However, the laser welding may be performed on a stack of three or more metal plates.

As can be seen from the foregoing description, the present invention allows accurate determination of the penetration depth of a weld portion, which is very practical and useful and therefore highly applicable in the industry.

What is claimed is:

1. A laser welding method for welding a weld portion by using a laser beam, the method comprising:
    emitting, to the weld portion, the laser beam and a measurement beam coaxially aligned with the laser beam, the measurement beam having a wavelength different from a wavelength of the laser beam;
    performing laser welding while moving an irradiation position of the laser beam and an irradiation position of the measurement beam in at least a first direction, a second direction opposite to the first direction, a third direction crossing the first direction, or a fourth direction opposite to the third direction;
    measuring a penetration depth of the weld portion in accordance with the measurement beam reflected on the weld portion during the laser welding;
    determining an optical axis deviation direction in which an optical axis of the measurement beam deviates from the laser beam, by relatively comparing a plurality of values measured; and
    adding a predetermined correction value to the values measured during the laser welding when the laser welding is performed in the optical axis deviation direction, wherein
    in the determining of the optical axis deviation direction, the plurality of values measured are compared with a predetermined reference value, and a direction in which a value smaller than the reference value is measured is determined to be the optical axis deviation direction.

2. The laser welding method of claim 1, wherein
    in the determining of the optical axis deviation direction, if the value smaller than the reference value is measured in both of the first direction and the third direction, a direction between the first direction and the third direction is determined to be the optical axis deviation direction.

3. The laser welding method of claim 2, wherein
    in the determining of the optical axis deviation direction, if a value measured during the movement in the first direction is smaller than a value measured during the movement in the third direction, a direction between the first direction and the third direction closer to the first direction is determined to be the optical axis deviation direction.

4. The laser welding method of claim 3, wherein
    in the adding of the correction value, the correction value added to the value measured during the movement in the first direction is greater than the correction value added to the value measured during the movement in the third direction.

5. The laser welding method of claim 1, wherein
    in the determining of the optical axis deviation direction, the values measured are compared with the reference value in accordance with a table storing a plurality of reference values determined according to output of the laser beam and a welding speed.

6. A laser welding method for welding a weld portion by using a laser beam, the method comprising:
    emitting, to the weld portion, the laser beam and a measurement beam coaxially aligned with the laser beam, the measurement beam having a wavelength different from a wavelength of the laser beam;
    performing laser welding while moving an irradiation position of the laser beam and an irradiation position of the measurement beam in at least a first direction, a second direction opposite to the first direction, a third direction crossing the first direction, or a fourth direction opposite to the third direction;
    measuring a penetration depth of the weld portion in accordance with the measurement beam reflected on the weld portion during the laser welding;
    determining an optical axis deviation direction in which an optical axis of the measurement beam deviates from the laser beam, by relatively comparing a plurality of values measured; and
    adding a predetermined correction value to the values measured during the laser welding when the laser welding is performed in the optical axis deviation direction,
    wherein
    in the determining of the optical axis deviation direction, a direction in which a value smallest among the plurality of values measured is measured is determined to be the optical axis deviation direction.

7. The laser welding method of claim 1, wherein
    in the adding of the correction value, the correction value used is a difference between a value greatest among the plurality of values measured and a value measured during the laser welding in the optical axis deviation direction.

8. The laser welding method of claim 1, wherein
in the adding of the correction value, the correction value used is a difference between a value measured during the laser welding in a direction opposite to the optical axis deviation direction and a value measured during the laser welding in the optical axis deviation direction.

\* \* \* \* \*